United States Patent [19]
Watanabe et al.

[11] Patent Number: 5,726,759
[45] Date of Patent: Mar. 10, 1998

[54] IMAGE FORMING APPARATUS

[75] Inventors: Yukio Watanabe, Machida; Tsuyoshi Kunishi, Moriyamachi; Mitsuka Abe, Yokohama; Yuichiro Toyohara, Fujisawa, all of Japan

[73] Assignee: Canon Kabushiki Kaisha, Tokyo, Japan

[21] Appl. No.: 736,479

[22] Filed: Oct. 24, 1996

[30] Foreign Application Priority Data

Oct. 27, 1995 [JP] Japan ................... 7-280426

[51] Int. Cl.⁶ .................................................. G03F 3/08
[52] U.S. Cl. ................... 358/296; 358/519; 399/26; 399/39
[58] Field of Search .......................... 355/208, 210; 399/26, 39, 40, 44, 46; 358/296, 519, 300, 443, 447, 448; 347/16, 110, 101, 129

[56] References Cited

U.S. PATENT DOCUMENTS

| | | | |
|---|---|---|---|
| 4,794,413 | 12/1988 | Yamazaki et al. | 346/160 |
| 4,847,638 | 7/1989 | Moriyama | 346/140 R |
| 4,888,636 | 12/1989 | Abe | 358/80 |
| 5,056,042 | 10/1991 | Leib | 364/519 |
| 5,160,967 | 11/1992 | Tonegawa | 355/208 |
| 5,305,057 | 4/1994 | Yoshihiro et al. | 355/203 |
| 5,513,014 | 4/1996 | Kariya et al. | 358/448 |

FOREIGN PATENT DOCUMENTS

| | | |
|---|---|---|
| 0271178 | 6/1988 | European Pat. Off. . |
| 0276107 | 7/1988 | European Pat. Off. . |
| 0461656 | 12/1991 | European Pat. Off. . |
| 0555102 | 8/1993 | European Pat. Off. . |
| 0568352 | 11/1993 | European Pat. Off. . |
| 3727808 | 2/1988 | Germany . |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An object of the present invention is to perform a well tonality reproduction according to a state of an image support body. In order to achieve the object, the present invention is featured by comprising the image support body for supporting an image which is to be formed on a medium, a signal generation means for generating an image signal representing the image, a detection means for detecting a value according to a membrane thickness of the image support body, and a conversion means for converting the image signal on the basis of the detected value according to the membrane thickness.

20 Claims, 8 Drawing Sheets

IMAGE FORMING APPARATUS

BACKGROUND OF THE INVENTION

1. Field of the Invention

The present invention relates to an electrophotographic image forming apparatus.

2. Related Background Art

Conventionally, it has been well known that, in an electrophotographic image forming apparatus, if a using state or using environment of a photosensitive drum or the like which acts as an image support body changes, a characteristic of the photosensitive drum also changes so that a significant change occurs in an output image. For example, as a temperature of the photosensitive drum rises, sensitivity of a photosensitive body rises, so that an output density changes. Further, as the photosensitive drum is continuously used, a membrane thickness of the photosensitive body gradually decreases. As a result, charge performance of the drum decreases and also the sensitivity deteriorates, so that the output density changes. Furthermore, due to decreasing of the membrane thickness of the photosensitive body, a scattering characteristic of an irradiation light on the photosensitive drum changes, so that reproducibility of fine or micro dots also changes. As a result, the charge performance of the photosensitive drum changes and also an output density characteristic changes to the extent which cannot be reasonably explained based on the change in sensitivity.

In addition, it has been known that the change in the using environment of the apparatus affects not only the photosensitive drum but also a development unit. That is, as a humidity in the using environment changes, a charge characteristic of developing powder in the development unit changes, so that the significant change occurs in the output density characteristic.

In order to solve such problems as described above, various methods have been applied. For example, with respect to the change in the membrane thickness of the photosensitive drum, it has been proposed a method in which a detection means is provided to detect the membrane thickness of the photosensitive drum, and a voltage to be applied to a charge unit is changed according to a detection signal from the detection means, so as to correct the change in the charge performance of the photosensitive drum.

Similarly, it has been known a method in which a voltage to be applied to a lamp for illuminating an original in accordance with the detection signal obtained by detecting the membrane thickness is changed to correct the change in the sensitivity of the photosensitive drum. Further, with respect to change in the temperature and the humidity, it has been proposed a method in which the temperature at a periphery of the photosensitive drum is detected, and the voltage to be applied to the change unit is changed according to the detected temperature and the humidity so as to correct the change in performance of the photosensitive drum.

However, in such the conventional methods, it was difficult to stabilize the output density characteristic against the changes in the sensitivity characteristic and the charge performance occurred due to the change in the membrane thickness of the medium such as the photosensitive drum or the like.

Especially, a tonality characteristic including a halftone was impossible to be well maintained against the change in the membrane thickness.

SUMMARY OF THE INVENTION

The present invention was made in consideration of such circumstances, and thus an object of the present invention is to provide an image forming apparatus which can realize well tonality reproduction irrespective of states of an image support body.

In order to achieve the above object, the image forming apparatus according to the present invention is featured by comprising the image support body for supporting an image which is to be formed on a medium; a signal generation means for generating an image signal representing the image; a detection means for detecting a value according to a membrane thickness of the image support body; and a conversion means for converting the image signal on the basis of the detected value according to the membrane thickness.

An another object of the present invention is to perform a well tonality characteristic control with constantly maintaining a printer characteristic.

A further another object of the present invention is to perform an accurate measurement of life of a photosensitive body and also perform the tonality characteristic control based on such the measurement.

The above and other objects of the present invention will be apparent from the following detailed description in conjunction with the attached drawings.

BRIEF DESCRIPTION OF THE DRAWINGS

FIG. 3 is a view illustrating an image signal process circuit 4 and the like;

DETAILED DESCRIPTION OF THE PREFERRED EMBODIMENTS

Hereinafter, embodiments of the present invention will be explained in detail with reference to the accompanying drawings.

(First Embodiment)

Figure 1:
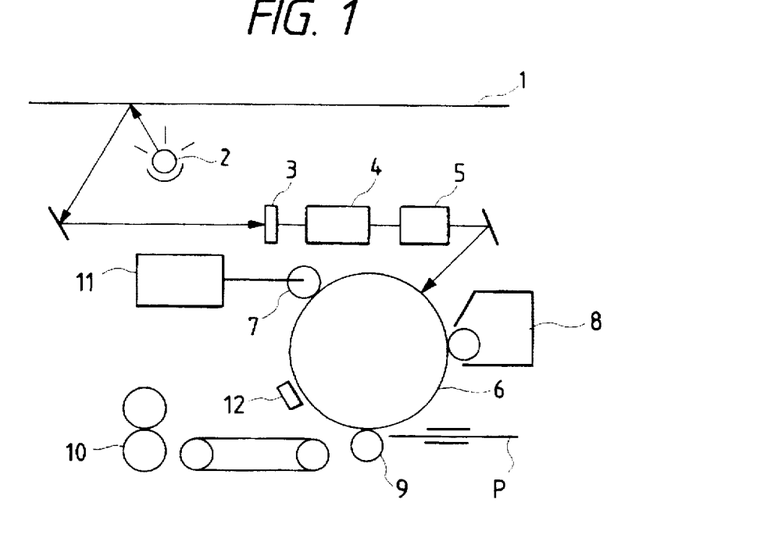
FIG. 1 is a perspective side view of an image forming apparatus according to embodiments of the present invention.

FIG. 1 is a perspective side view of an image forming apparatus according to the first embodiment of the present invention.

In the apparatus, a charge member 7 is arranged to be attached to a photosensitive drum 6. By applying a predetermined voltage from a high-voltage power source 11 to the charge member 7, the photosensitive drum 6 is uniformly charged.

Image information on an original 1 is converted into an image signal by introducing a light illuminated by an original illumination lamp 2 into a CCD sensor 3. The obtained image signal is processed by an image signal process circuit 4 and then output as a driven signal for driving a laser driver 5. Therefore, an image exposing according to the image information on the original 1 is performed on the photosensitive drum 6 which has been uniformly charged.

Subsequently, it is performed a developing process in which a developing is performed to the photosensitive drum 6 on which an electrostatic latent image has been formed, by using a toner from a developing unit 8.

Further, a toner image formed through the developing process is transferred by a transfer unit 9 onto a transfer paper P which is synchronously fed. The transfer paper P passed through such a transfer process is fed to a fixing unit 10 by a feed belt, and the toner on the transfer paper P is fixed to the paper P by the fixing unit 10. Reference numeral 12 denotes a cleaner for eliminating the toner on the photosensitive drum 6 after the transfer terminated.

Figure 6:
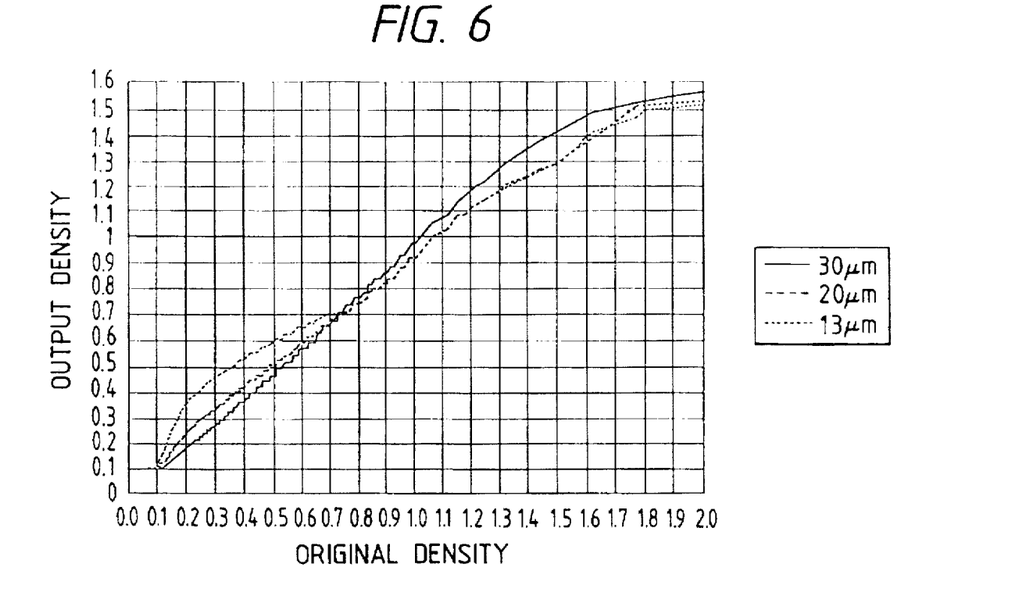
FIG. 6 is a view illustrating a change in an output density characteristic for a membrane thickness of a photosensitive body of a photosensitive drum, in a case not according to the present invention.

FIG. 6 shows an output density characteristic in a case where photosensitive bodies respectively having membrane thickness 30 μm, 20 μm and 13 μm are used as the photosensitive drum 6. In FIG. 6, a lateral axis represents an original density and a longitudinal axis represents an output density of the image forming apparatus according to the present invention. As clearly shown in FIG. 6, it can be well understood that, if the membrane thickness of the photosensitive body changes, the output density characteristic significantly changes.

Therefore, in the present embodiment, by detecting a quantity of a current flowing in the photosensitive drum 6 in a case where a predetermined voltage is applied to the photosensitive drum 6 by the high-voltage power source 11 through the charge member 7, a detection signal corresponding to the membrane thickness of the photosensitive body of the photosensitive drum 6 is obtained, and then the output density characteristic due to the change in the membrane thickness of the photosensitive body is corrected.

Hereinafter, the first embodiment of the present invention will be explained concretely.

Figure 2:
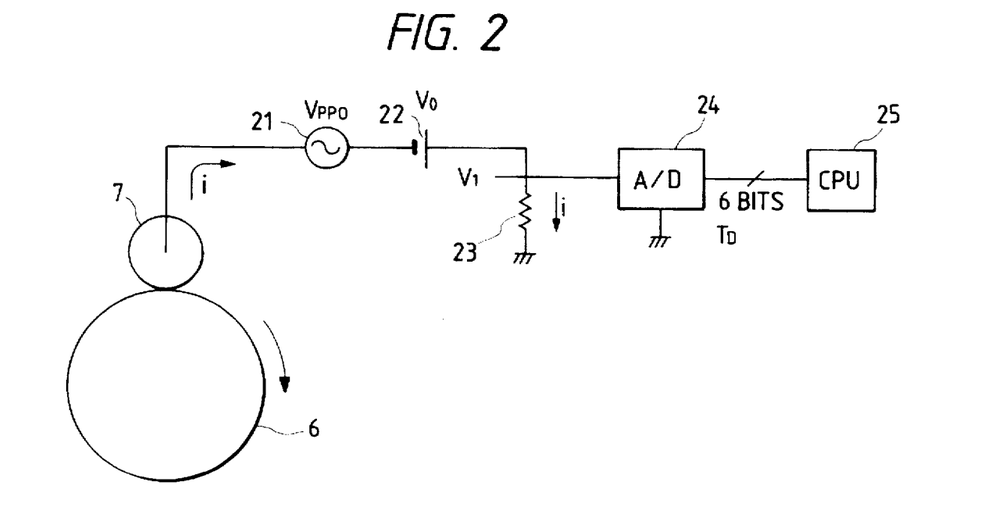
FIG. 2 is a view illustrating structure of a membrane thickness detection unit.

FIG. 2 is a view showing structure of a detection unit for detecting a value according to the membrane thickness of the photosensitive body.

In FIG. 2, reference numeral 21 denotes an AC voltage generation source, reference numeral 22 denotes a DC voltage generation source, reference numeral 23 denotes a detection resistor, reference numeral 24 denotes an A/D converter and reference numeral 25 denotes a CPU. While the photosensitive drum 6 is rotating, the DC voltage generation source 22 generates a predetermined voltage $V_0$ such that the voltage $V_0$ overlaps a voltage $V_{PPO}$, and a voltage generated across both edges of the detection resistor 23 according to a current i is converted by the A/D converter 24 into a six-bit digital signal $T_D$. The six bit digital signal $T_D$ is a signal which is according to the membrane thickness of the photosensitive body, which thickness is utilized as a barometer in case of measuring a newness of the drum.

Figure 5:
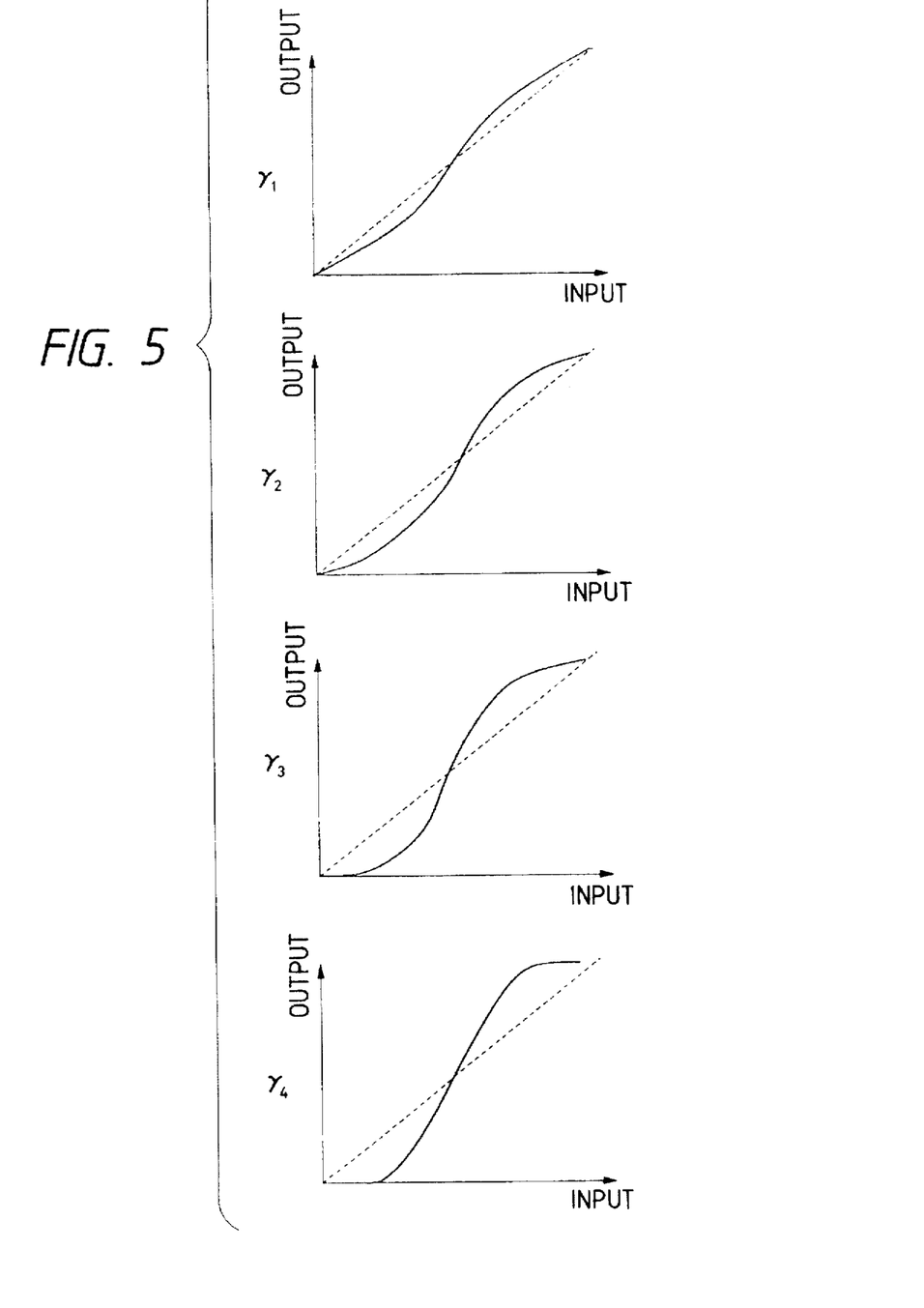
FIG. 5 is a view illustrating a gamma ($\gamma$) conversion characteristic.

In response to the detection signal $T_D$, the CPU 25 classifies the membrane thickness of the photosensitive body on the basis of following standard, and selects one of a plurality of gamma (γ) conversion characteristics shown in FIG. 5.

$T_D > A \rightarrow \gamma 1$
$A \geq T_D > B \rightarrow \gamma 2$
$B \geq T_D > C \rightarrow \gamma 3$
$C \geq T_D \rightarrow \gamma 4$ (where A, B and C satisfy a condition A>B>C)

In this case, as a value of the signal $T_D$ is large, the drum is new. Therefore, as the value of the signal $T_D$ becomes large, the membrane thickness of the photosensitive body is judged to become large. On the other hand, as the value of the signal $T_D$ becomes small, the membrane thickness of the photosensitive body is judged to become small due to deterioration of the drum. Such judgments are performed by the CPU 25, and then a control signal for selecting the gamma characteristic shown in FIG. 5 is output from the CPU 25. In FIG. 5, as the gamma conversion characteristic changes from γ1 to γ4, inclination of a curve becomes large.

In a case where one of the gamma conversion characteristics γ1 to γ3 is selected, adjusting of a process parameter for image formation such as a developing bias or the like responsive to the signal $T_D$ is not adjusted. This is because it is better for easily controlling the tonality characteristic that a characteristic of a printer is made stable by maintaining an image forming condition as much as possible and the tonality characteristic including the halftone is adjusted through an image data conversion process.

On the other hand, in a case where the gamma conversion characteristic γ4 is selected, the developing bias of the developing unit 8 is also adjusted according to the value of the signal $T_D$. Concretely, with maintaining contrast, the developing bias capable of preventing a fogging phenomenon is set. According to such the developing bias, the gamma conversion characteristic γ4 becomes a gamma conversion characteristic which can be obtained with fully considering a change in the printer characteristic due to a change in this developing bias.

Figure 3:
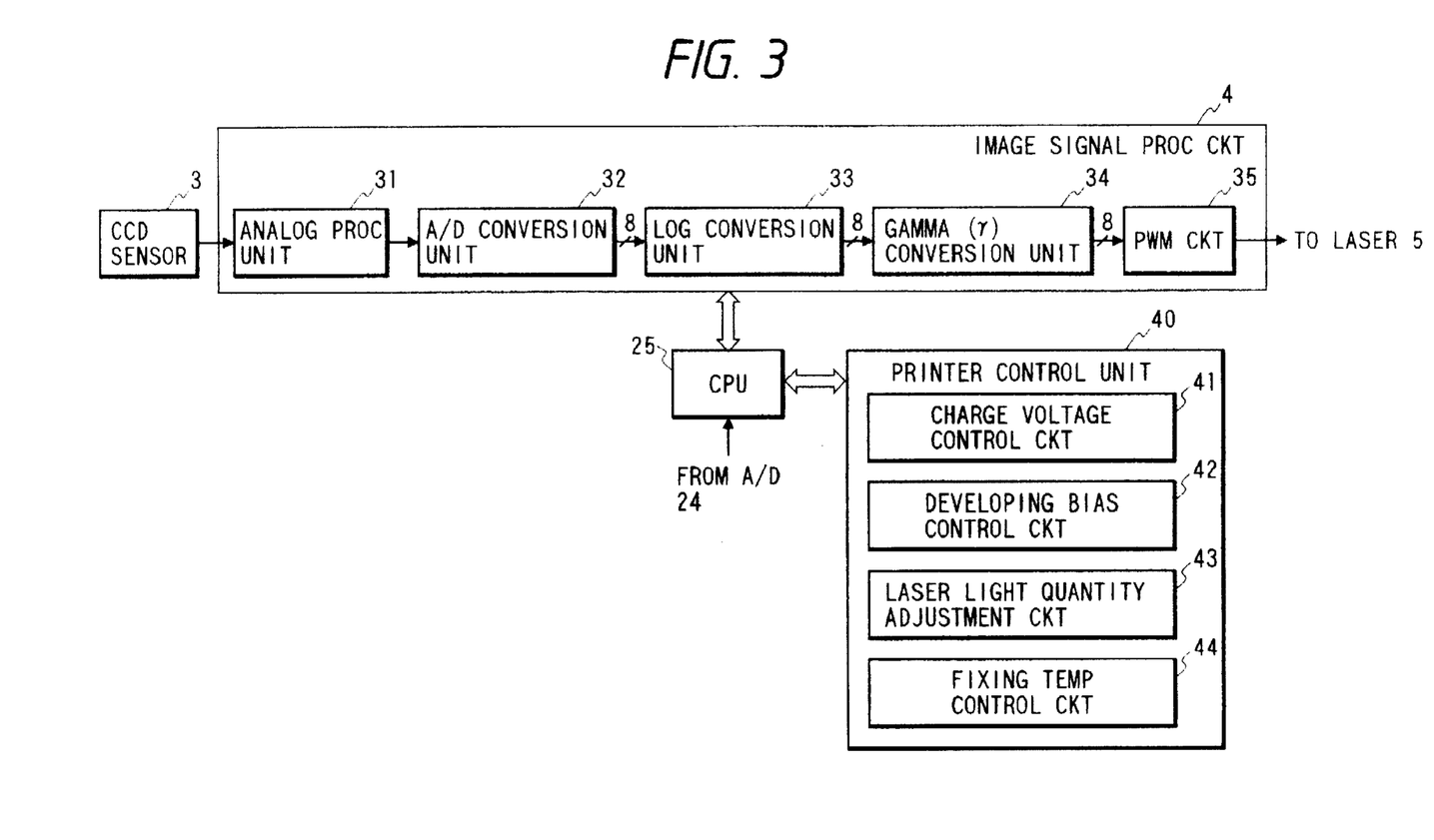

FIG. 3 is a block diagram showing the image signal process circuit 4 and the like according to the present embodiment.

An analog signal from the CCD sensor 3 is subjected to gain adjusting and shading correcting by an analog process unit 31. The obtained signal is converted into an eight-bit digital signal by an A/D conversion unit 32, and then further converted into a density signal by a logarithmic conversion unit 33. Subsequently, the obtained density signal is subjected to the above gamma converting by a gamma conversion unit 34, and then further converted into a pulse-width signal by a PWM circuit 35 for driving the laser driver 5.

The gamma conversion unit 34 and other units included in the image signal process circuit 4 are controlled by the CPU 25. The CPU 25 receives the value according to the membrane thickness from the A/D converter 24 and then performs the controlling according to the received value. Reference numeral 40 denotes a printer control unit which includes a charge voltage control circuit 41 for controlling a charge voltage applied by the high-voltage power source 11, a developing bias control circuit 42 for controlling the developing bias of the developing unit 8, a laser light quantity adjustment circuit 43 for adjusting a quantity of a laser beam generated by the laser driver 5, a fixing temperature control circuit 44 for controlling a fixing temperature of the fixing unit 10, and the like.

As described above, the CPU 25 controls the gamma conversion characteristic in the gamma conversion unit 34, in response to the signal $T_D$. In a specific case, the CPU 25 also controls the developing bias through the developing bias control circuit 42, in response to the signal $T_D$.

Figure 4:
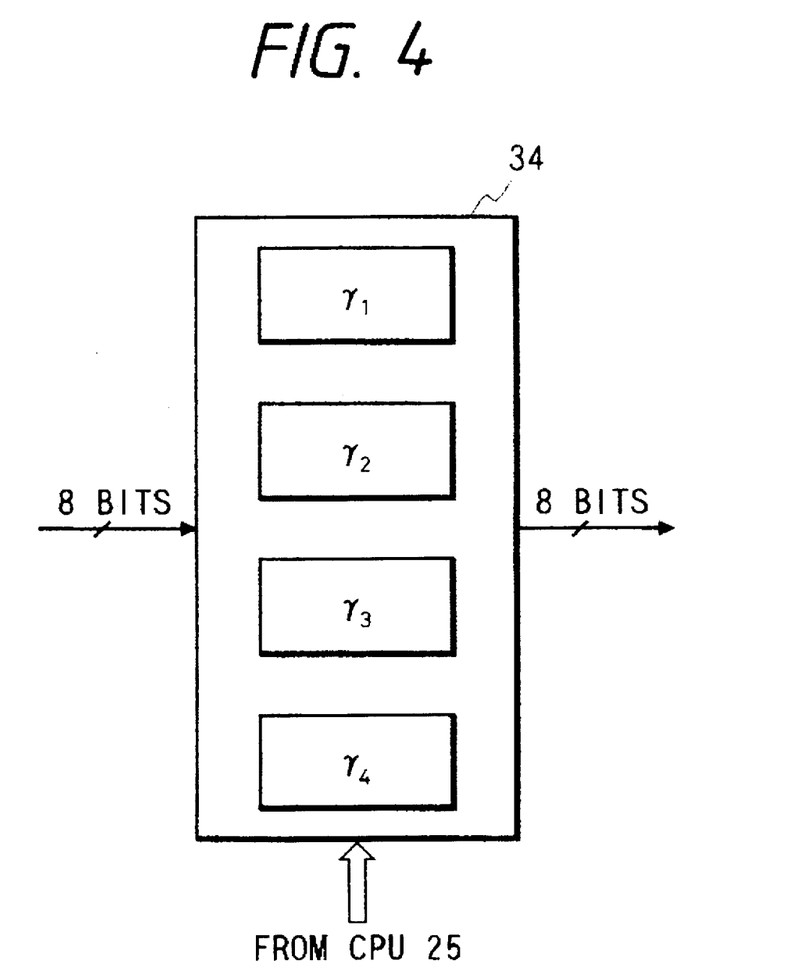
FIG. 4 is a view illustrating a gamma ($\gamma$) conversion unit.

The gamma conversion unit 34 which has the structure shown in FIG. 4, is a table conversion circuit in which one of the gamma conversion characteristics γ1 to γ4 is selected responsive to a selection signal from the CPU 25.

This table conversion circuit can be realized by, e.g., causing an ROM to store input and output characteristics of γ1 to γ4. Further, if the table conversion circuit is realized by an RAM, a gamma conversion table may be formed according to the membrane thickness in such a manner that a set of table data of the characteristic to be selected is set in the RAM by the CPU 25.

Figure 7:
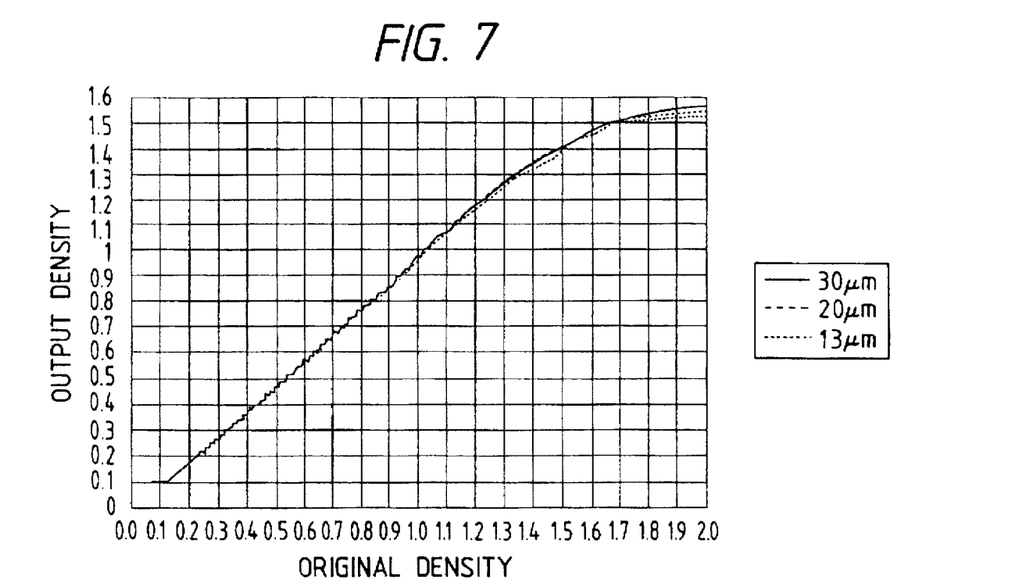
FIG. 7 is a view illustrating a change in an output density characteristic for a membrane thickness of a photosensitive body of a photosensitive drum, in a case according to a first embodiment of the present invention.

Relationships between the original density and the output density obtained by the above-described structure are shown in FIG. 7, with respect to 30 μm, 20 μm and 13 μm.

According to the present embodiment, the constant output density characteristic can be obtained irrespective of the membrane thickness of the photosensitive body.

Especially, in the present embodiment, the density characteristic of the image data representing an image for reproduction is converted based on the membrane thickness of the photosensitive body, while the parameter such as the developing bias or the like in the image forming process is not changed based on the value according to the membrane thickness, so that the image forming characteristic of the printer is fixed and the tonality characteristic including an intermediate level can be well controlled.

(Second Embodiment)

Figure 8:
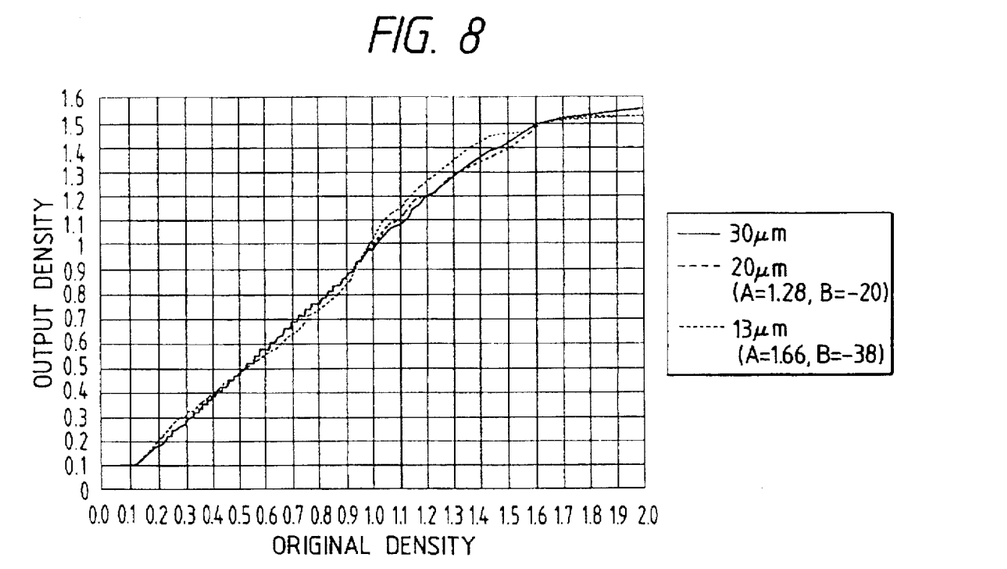
FIG. 8 is a view illustrating a change in an output density characteristic for a membrane thickness of a photosensitive body of a photosensitive drum, in a case according to a second embodiment of the present invention.

FIG. 8 shows a result obtained by performing a following primary conversion of a density signal, instead of a non-linear conversion by a density conversion table.

$$D_{out} = A \times (D_{in} + B)$$

where $D_{out}$: density signal after primary conversion $D_{in}$: density signal before primary conversion A, B: coefficients In this case, it can be understood that substantially constant output density characteristics can be obtained.

(Third Embodiment)

Figure 9:
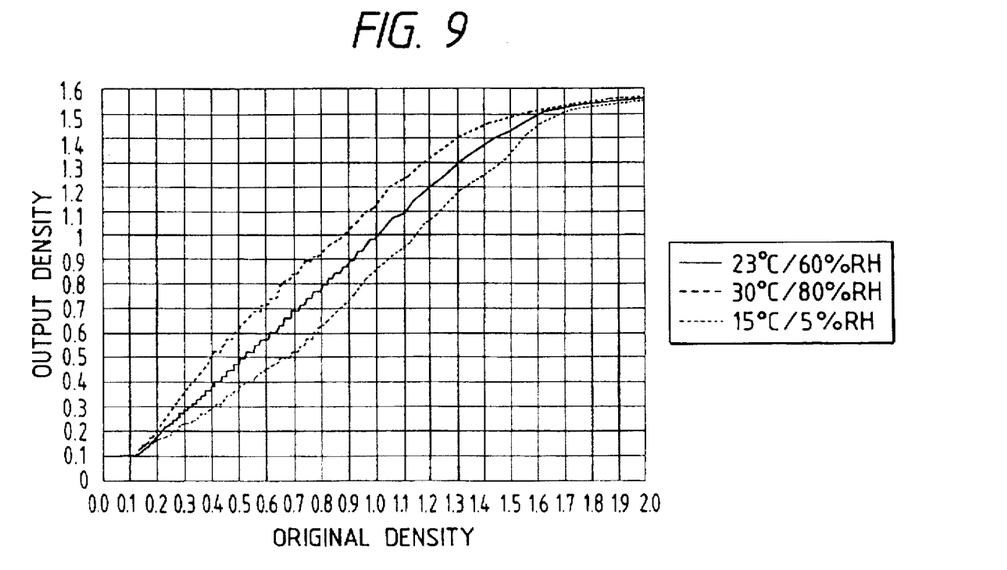
FIG. 9 is a view illustrating a change in an output density characteristic for a temperature and a humidity of a photosensitive drum, in a case not according to the present invention.

FIG. 9 shows output density characteristics in a case where correcting by an image signal process circuit (or apparatus) 4 is not performed when a temperature and a humidity of a photosensitive drum is set as 15° C. 5% RH, 23° C. 60% RH and 30° C. 80% RH.

Even in this case a significant change in the output density characteristics are observed.

Figure 10:
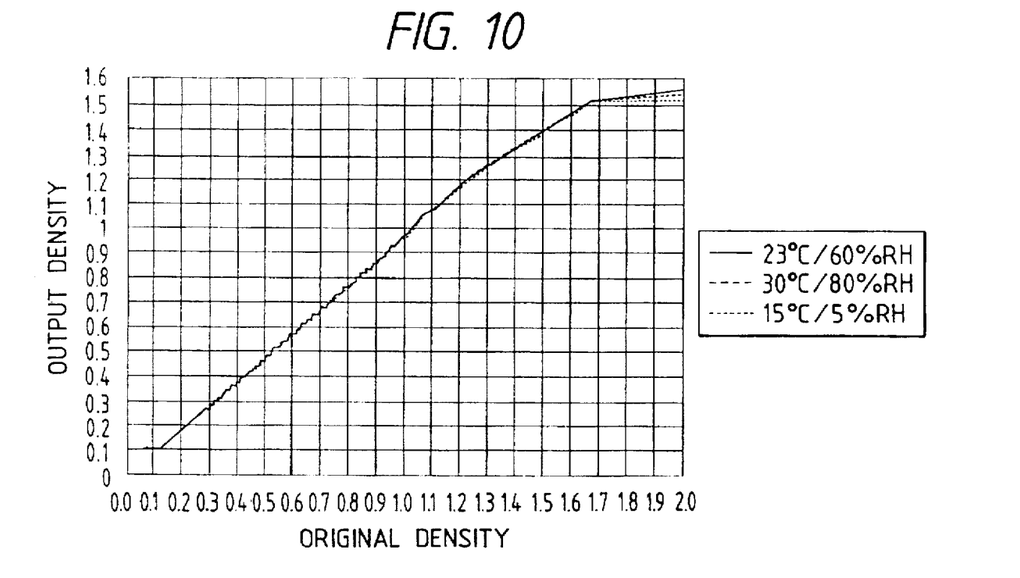
FIG. 10 is a view illustrating a change in an output density characteristic for a temperature and a humidity of a photosensitive drum, in a case according to a third embodiment of the present invention.

FIG. 10 shows output density characteristics in a case where the temperature of the photosensitive drum is detected by a temperature and humidity sensor and then density signal converting by using a density conversion table is performed in the image signal process circuit 4 on the basis of a detection output. In this case, the constant output density characteristics can be obtained irrespective of the temperature and the humidity of the photosensitive drum.

(Fourth Embodiment)

Figure 11:
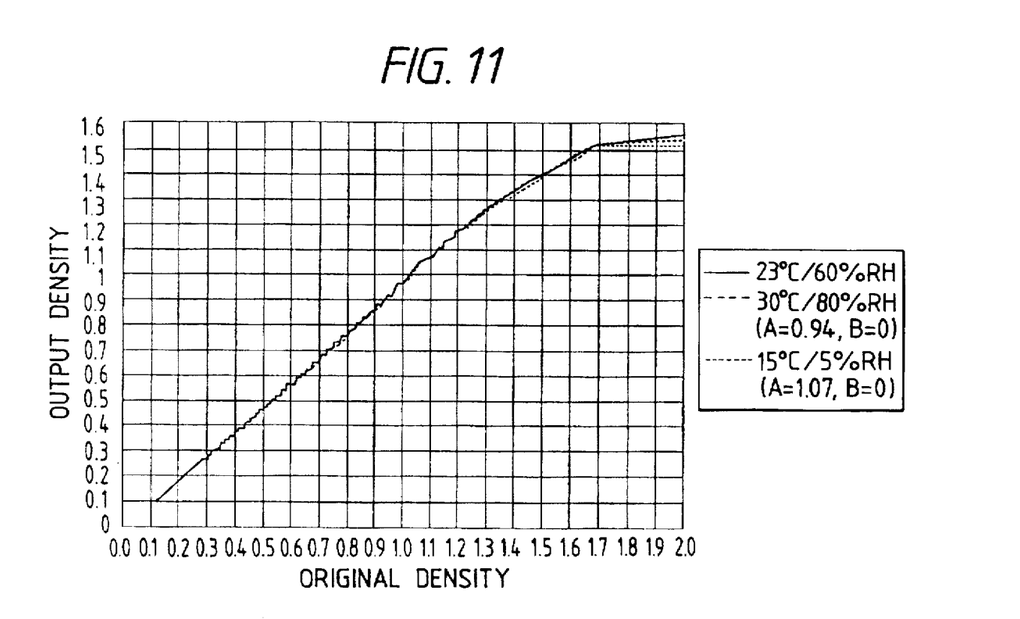
FIG. 11 is a view illustrating a change in an output density characteristic for a temperature and a humidity of a photosensitive drum, in a case according to a fourth embodiment of the present invention.

FIG. 11 shows a result obtained by performing correcting in an image signal process circuit (or apparatus) 4 in a case where a temperature and a humidity of a photosensitive drum is set as 15° C. 5% RH, 23° C. 60% RH and 30° C. 80% RH, by using a primary conversion of a density signal instead of a density conversion table. Also in such a case, it can be understood that substantially constant output density characteristics can be obtained.

(Fifth Embodiment)

As a timing of detecting the membrane thickness in the first embodiment, for example, there can be used a pre- and multi-rotation of the drum due to on/off of the power source of the image forming apparatus, a pre-rotation time of the image support body (before the image forming), and a post-rotation time of the image support body (after the image forming). In order to increase detection accuracy for the detection means, it is necessary to prolong a detection time. Further, as the detection is frequently performed, the detection timing increasingly follows changes in a photosensitive body, and also increasingly follows a case where the photosensitive body which has been used for a long period of time is changed to new one.

However, if the detection time is unnecessarily prolonged to increase the detection accuracy a total current-carrying time for the photosensitive body is prolonged. As a result, life of the photosensitive body becomes short. Further, a throughput of the image forming apparatus comes to be decreased. In addition, if the detection is frequently performed more than needed, the life of the photosensitive body becomes short and the throughput comes to be decreased.

According to the present embodiment, it can be well prevented that the life of the photosensitive body is shortened and the throughput as the image forming apparatus is decreased, and at the same time the detection timing well follows the change in the membrane thickness of the photosensitive body, especially the abrupt change caused by exchanging the photosensitive body. Such a compatibility will be explained in detail, hereinafter.

Generally, if the membrane thickness of the photosensitive body reduces to the extent of 13 μm, a crack or a flaw begins to occur on the photosensitive drum and thus a faulty image is output, so that it is necessary to change the photosensitive drum 6 into new one. On the other hand, it is supposed that the detecting of the photosensitive body membrane thickness should be performed in the post-rotation of the drum after the image forming corresponding to about 500 to 1,000 sheets to prolong the life of the photosensitive drum 6 to some extent. Such the detecting of the membrane thickness at the post-rotation time is performed accurately by using an enough time of about ten seconds. In a case where the gamma conversion table is changed in the post-rotation after the image forming corresponding to about 500 to 1,000 sheets, if the photosensitive drum 6 is changed to new one, in the worst case, the image forming is performed by using the gamma conversion table which has been optimized to a state where the membrane thickness of the photosensitive drum 6 is thin, during the image forming between 500 to 1,000 sheets. For example, if the gamma conversion table for the membrane thickness of 13 μm is used for the photosensitive drum having the membrane thickness of 30 μm, inclination of the curve of the output image density for the original density becomes abrupt, so that a deviation from a linear line becomes large.

Figure 12:
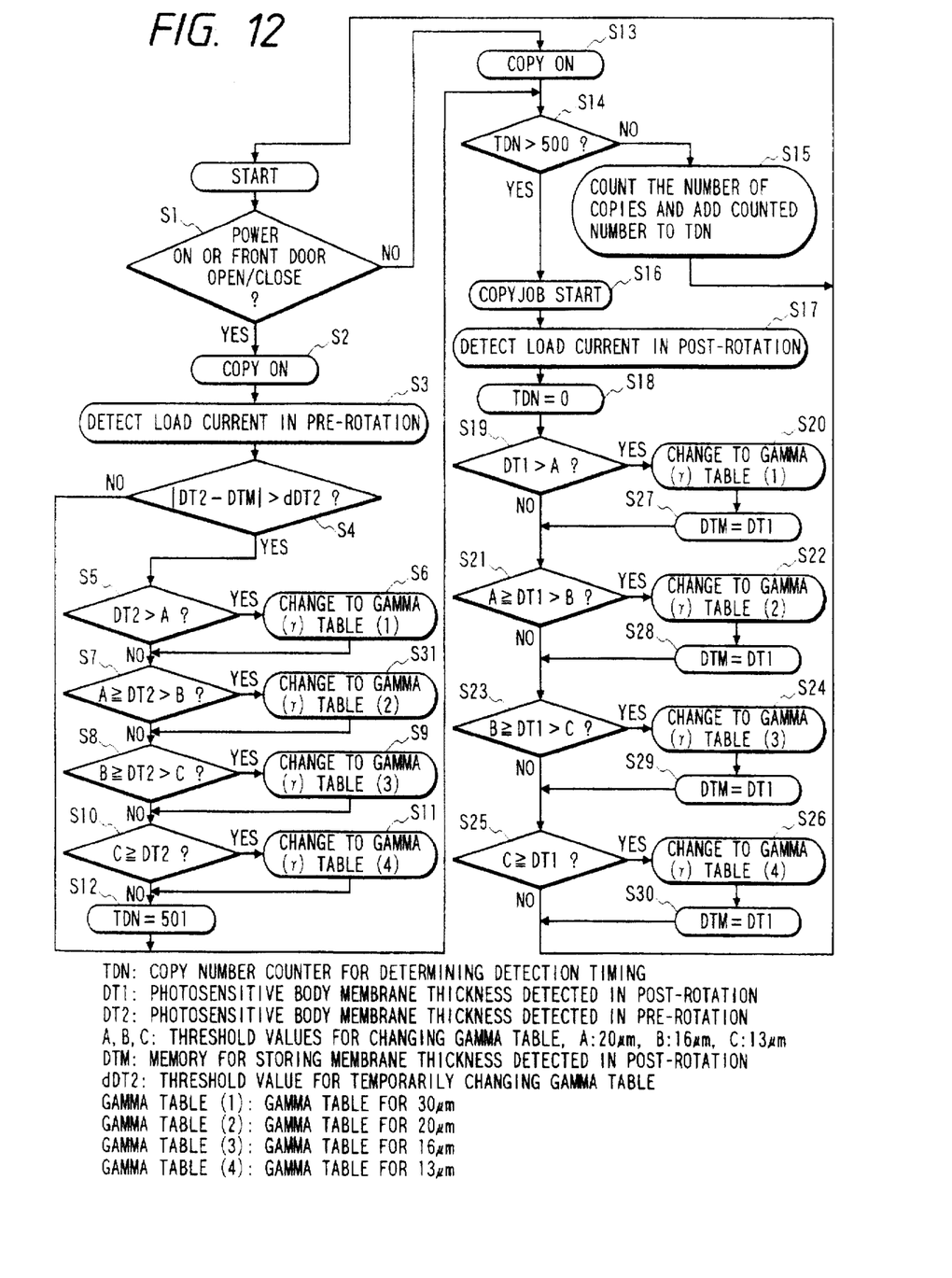
FIG. 12 is a flow chart showing a process procedure according to a fifth embodiment of the present invention.

In consideration of such points, in the present embodiment, a CPU 25 detects the membrane thickness of the photosensitive body and selects the gamma conversion table in accordance with a flow chart shown in FIG. 12. In this case, the fundamental structure for performing such operations is the same as that in the first embodiment.

Initially, a power-on state or an open/close state of a front door for exchanging the photosensitive drum is detected (step S1). If detected, in response to a turned-on state of a copy switch (step S2), the membrane thickness of the photosensitive body is detected in the pre-rotation before the image forming (step S3). Since such the membrane thickness detecting in the pre-rotation is performed for a short period of time (1 to 2 seconds), the life of the drum is not so affected, but the detection accuracy is low. Then, an absolute value of a difference between a detection signal $DT_2$ which is obtained in such the detecting and a previously-stored detection signal DTM which is obtained when the previous gamma conversion table was changed (step S4). If the absolute value is larger than a predetermined threshold value $dDT_2$ (about 5 µm to 10 µm), the gamma conversion table is changed by using the detection signal $DT_2$ in the same manner as that described in the first embodiment (steps S5 to S11, and S31). The reason why such a judgment is performed is that, since the detection signal $DT_2$ in the pre-rotation before the image forming does not have enough accuracy, it is needed to prevent an unconditional change or switch of the gamma conversion table responsive to such the detection signal $DT_2$. Because of the same reason, in a case where the gamma conversion table is changed in response to the detection signal in the pre-rotation before the image forming, a count value TDN obtained by counting the number of copies is set as "501" for the detecting of the photosensitive body membrane thickness in the post-rotation after the subsequent image forming (step S12). On the other hand, in a case (1) where the power-on state or the open/close state of the front door is not detected in the step S1, or in a case (2) where it is judged in the step S4 to satisfy $|DT_2-DTM| \leq dDT_2$, (3) it is further judged (based on the turned-on state of the copy switch (step S13) in the above case (1)) whether or not the TDN is larger than 500 after changing the gamma conversion table based on the membrane thickness detection in the pre-rotation (step S14). If yes in the step S14, a copy job starts (step S16) and thereafter the membrane thickness detection in the post-rotation is performed (step S17) and the gamma conversion table is changed (steps S19 to S26). In the above operation, a detection signal $DT_1$ is set as a detected membrane thickness value in the post-rotation, into a memory DTM (step S27 to S30).

As described above, by detecting the membrane thickness in the post-rotation, the suitable gamma conversion table can be selected by the less number of detection times, the short period of time and the highly accurate membrane thickness measuring.

In the same manner as in the previous embodiments, a primary converting may be used instead of the gamma conversion table changing in the present embodiment.

Further, in the present invention, the gamma conversion table is selected on the basis of the one-time detecting. However, in order to increase accuracy, the gamma conversion table may be selected on the basis of a result obtained through a plurality of detecting. For example, if the gamma conversion table is changed when the detection signal $T_D$ exceeds one threshold value accumulatively three times, the highly accurate optimization of the gamma table becomes possible.

Furthermore, it is not needed that the value according to the membrane thickness of the photosensitive body is a value strictly representing the membrane thickness itself. That is, such the value may be a value which changes according to the change in the membrane thickness.

Furthermore, the photosensitive body is not limited to the photosensitive drum, but may be a photosensitive belt.

Furthermore, in the above embodiments, the developing bias is exceptionally controlled according to the signal $T_D$. However, such exception can be eliminated, and the signal $T_D$ may be always managed independently of the developing bias.

According to the above embodiments, it can be well prevented that the life of the photosensitive body is short-ened and the throughput as the image forming apparatus is decreased, and at the same time the detection timing well follows the change in the membrane thickness of the photosensitive body. That is, a compatibility between such two conflicting need can be realized.

Although the present invention has been described above with respect to the preferred embodiments, the present invention is not limited to the foregoing embodiments but may modifications and variations are possible within the spirit and scope of the appended claims.

What is claimed is:

1. An image forming apparatus comprising:
   an image support body for supporting an image which is to be formed on a medium;
   signal generation means for generating an image signal representing the image;
   detection means for detecting a value according to a membrane thickness of said image support body; and
   conversion means for converting the image signal on the basis of the detected value according to the membrane thickness.

2. An apparatus according to claim 1, wherein said image support body is a photosensitive body.

3. An apparatus according to claim 1, wherein said conversion means performs a primary conversion.

4. An apparatus according to claim 1, wherein a detection timing by said detection means is determined as a timing which is to be set under possibility that said image support body was changed.

5. An apparatus according to claim 4, wherein the detection timing is a time when said image support body rotates before an image formation or a time when said image support body rotates immediately after the image formation.

6. An apparatus according to claim 5, wherein detection accuracy immediately after the image formation is higher than the detection accuracy before the image formation.

7. An apparatus according to claim 1, wherein a gamma (γ) characteristic is changed in accordance with plural-time detection results by said detection means.

8. An apparatus according to claim 1, wherein said detection means detects the value according to the membrane thickness of said image support body, by measuring a current flowing when a voltage is superimposed to said image support body.

9. An apparatus according to claim 1, further comprising developing means for developing the image, and
   wherein a developing condition of said developing means is not changed in principle by the value according to the membrane thickness of said image support body.

10. An apparatus according to claim 9, wherein the developing condition is exceptionally changed by the value according to the membrane thickness, in a predetermined case where deterioration of said image support body is serious.

11. An image forming apparatus comprising:
    an image support body for supporting an image which is to be formed on a medium;
    signal generation means for generating an image signal representing the image;
    detection means for measuring a current flowing when a voltage is superimposed to said image support body, to detect a value according to a membrane thickness of said image support body; and
    conversion means for converting the image signal on the basis of the detection value according to the membrane thickness.

12. An apparatus according to claim 11, wherein said image support body is a photosensitive body.

13. An apparatus according to claim 11, wherein said conversion means performs a primary conversion.

14. An apparatus according to claim 11, wherein a detection timing by said detection means is determined as a timing which is to be set under possibility that said image support body was changed.

15. An apparatus according to claim 14, wherein the detection timing is a time when said image support body rotates before an image formation or a time when said image support body rotates immediately after the image formation.

16. An apparatus according to claim 15, wherein detection accuracy immediately after the image formation is higher than the detection accuracy before the image formation.

17. An apparatus according to claim 11, wherein a gamma ($\gamma$) characteristic is changed in accordance with plural-time detection results by said detection means.

18. An apparatus according to claim 11, wherein said detection means detects the value according to the membrane thickness of said image support body, by measuring a current flowing when a voltage is superimposed to said image support body.

19. An apparatus according to claim 11, further comprising developing means for developing the image, and wherein a developing condition of said developing means is not changed in principle by the value according to the membrane thickness of said image support body.

20. An apparatus according to claim 19, wherein the developing condition is exceptionally changed by the value according to the membrane thickness, in a predetermined case where deterioration of said image support body is serious.

* * * * *

UNITED STATES PATENT AND TRADEMARK OFFICE
CERTIFICATE OF CORRECTION

PATENT NO. : 5,726,759

DATED : March 10, 1998

INVENTORS : Yukio Watanabe, et al.

Page 1 of 2

It is certified that error appears in the above-identified patent and that said Letters Patent is hereby corrected as shown below:

COLUMN 1

Line 52, "change" should read --charge--;
   Line 55, "the" should be deleted; and
   Line 58, "occurred" should read --that occurred--.

COLUMN 2

Line 14, "a well" should read --well a--; and
   Line 28, "structure" should read --the structure--.

COLUMN 3

Line 14, "exposing" should read --exposure--.

COLUMN 5

Line 31, "a" (second occurrence) should read --the--.

COLUMN 6

Line 24, "as" should read --of--;
   Line 31, "reduces" should read --decreases--; and
   Line 45, "to" should read --to a--.

UNITED STATES PATENT AND TRADEMARK OFFICE
CERTIFICATE OF CORRECTION

PATENT NO. : 5,726,759

DATED : March 10, 1998

INVENTORS : Yukio Watanabe, et al.

It is certified that error appears in the above-identified patent and that said Letters Patent is hereby corrected as shown below:

COLUMN 7

Line 3, "the" should be deleted;
Line 15, "responsive" should read --in response-- and "such" should be deleted;
Line 27, "(1))" should read --(1)--;
Line 49, "detecting" should read --detections--; and
Line 57, "such" should be deleted.

COLUMN 8

Line 1, "as" should read --of--; and
Line 9, "may" should read --many--.

Signed and Sealed this

Seventeenth Day of November, 1998

Attest:

BRUCE LEHMAN

Attesting Officer

Commissioner of Patents and Trademarks